(No Model.) 2 Sheets—Sheet 2.
G. S. ROMINGER.
WORM GEAR CUTTING MACHINE.
No. 490,503. Patented Jan. 24, 1893.
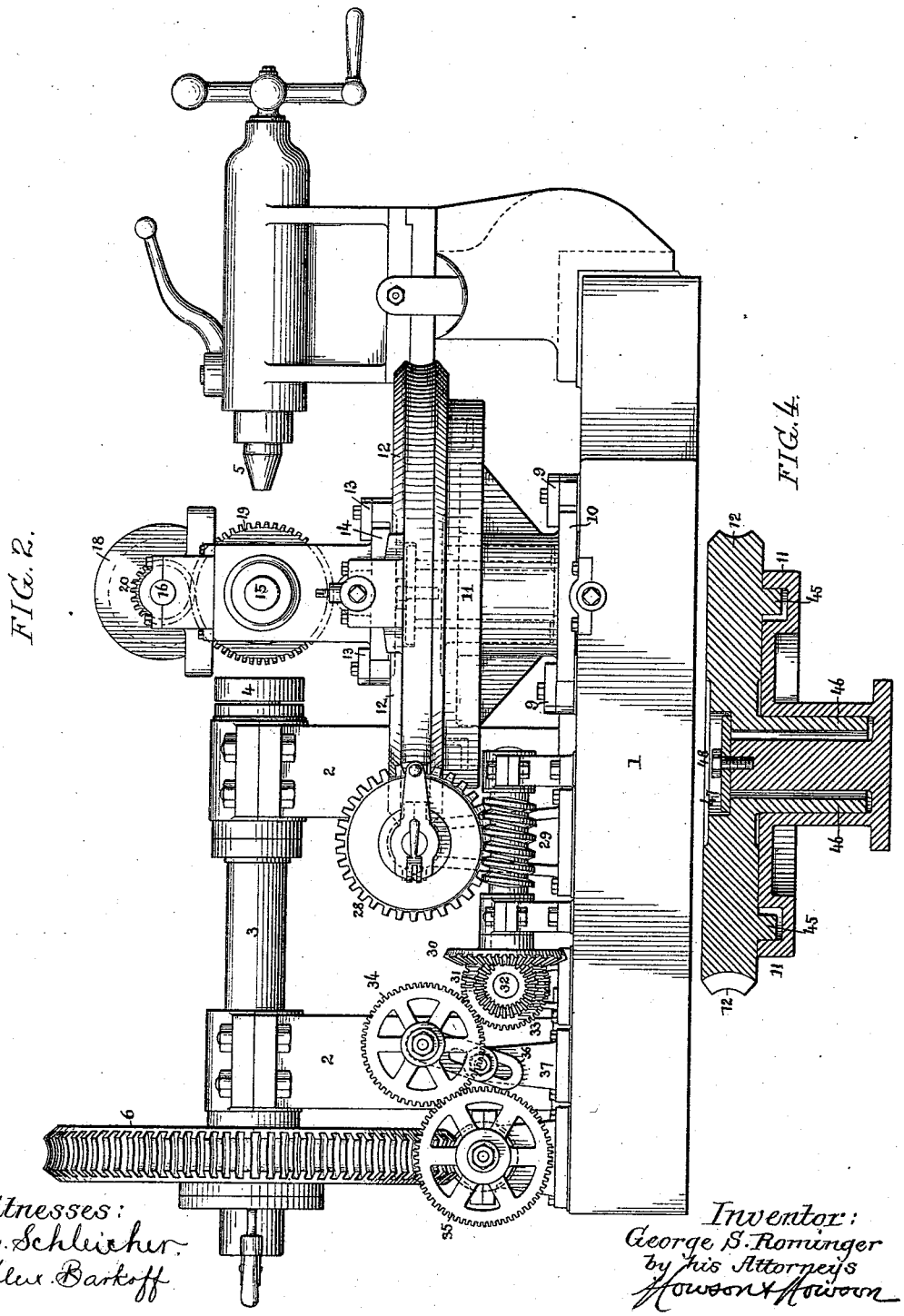
Witnesses:
R. Schleicher
Alex Barkoff
Inventor:
George S. Rominger
by his Attorneys
Howson & Howson

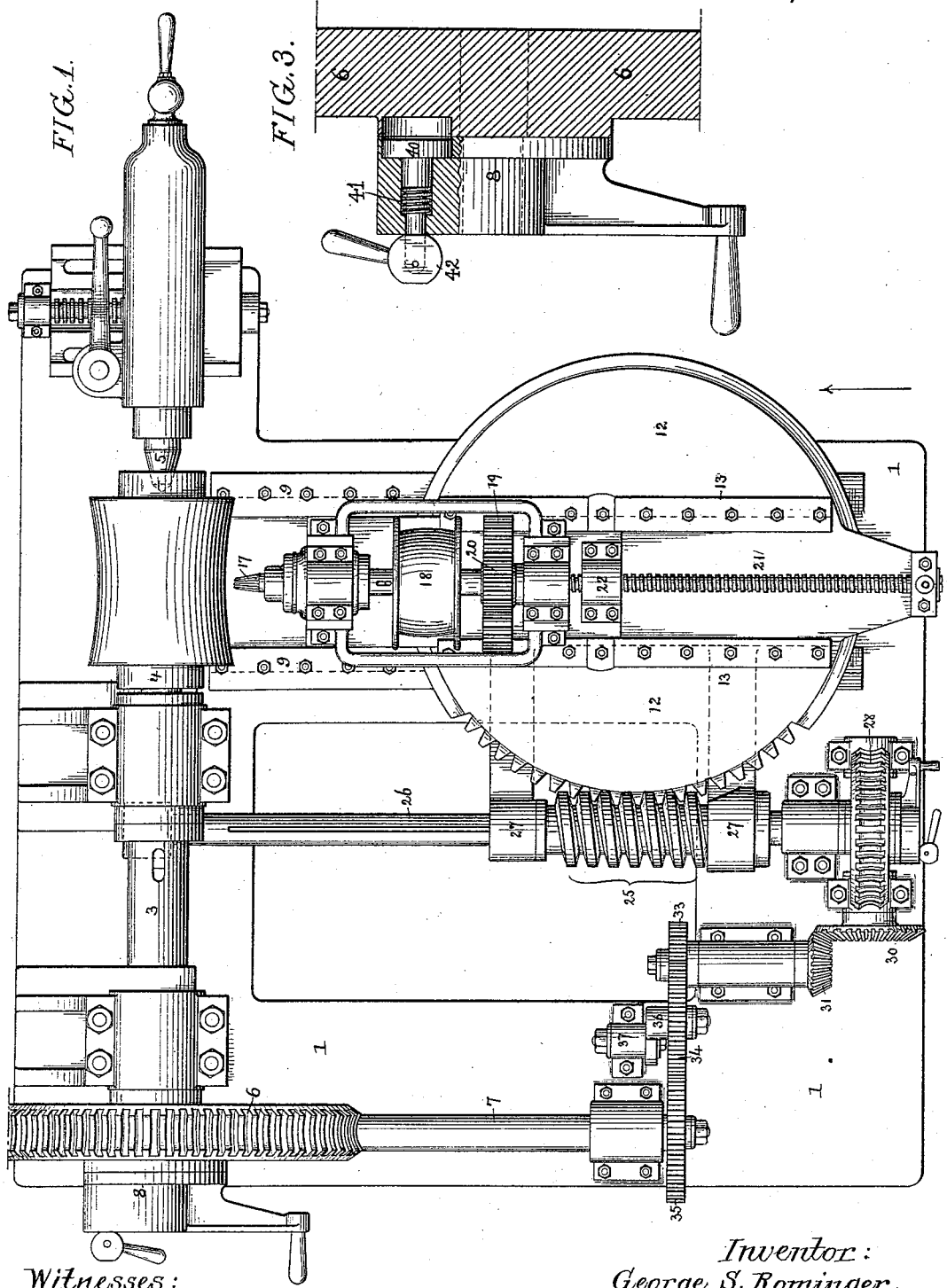

UNITED STATES PATENT OFFICE.

GEORGE S. ROMINGER, OF PHILADELPHIA, PENNSYLVANIA.

WORM-GEAR-CUTTING MACHINE.

SPECIFICATION forming part of Letters Patent No. 490,503, dated January 24, 1893.

Application filed April 11, 1892. Serial No. 428,644. (No model.)

*To all whom it may concern:*

Be it known that I, GEORGE S. ROMINGER, a citizen of the United States, and a resident of Philadelphia, Pennsylvania, have invented certain Improvements in Worm-Gear-Cutting Machines, of which the following is a specification.

The object of my invention is to provide a machine for accurately cutting a thread or threads upon a worm so that the pitch line of the thread or threads will follow the contour of the wheel with which the worm engages. This object I attain in the manner hereinafter set forth, reference being had to the accompanying drawings in which—

Figure 1, is a plan view of a machine constructed in accordance with my invention; Fig. 2, is an end view of the same looking in the direction of the arrow, Fig. 1; and Figs. 3 and 4, are detached sectional views of parts of the machine.

1 represents the base or foundation of the machine upon which are mounted the pedestals or bearings 2, 2, for a shaft 3 which carries a head stock 4 to which is intended to be secured one end of the blank from which the desired worm is to be produced, the opposite end of said blank being mounted upon the tail stock 5, similar to that of an ordinary turning lathe, as shown for instance in Fig. 1. At the outer end of the shaft 3 is a worm wheel 6 which is driven by a worm upon a transverse shaft 7 mounted in suitable bearings upon the bed plate or foundation 1, said worm wheel 6 being loose upon the shaft 3 but capable of being clutched thereto by an outer clutch disk 8 which is secured to the shaft 3 and can be adjusted to different circumferential positions in respect to the worm wheel, this disk being provided with means for locking it to said worm wheel at equidistant points, for instance at every half turn if a double-thread worm is to be produced; at every one-third of a turn if a three-thread worm is to be produced, and so on, so that the cutting of the threads may be properly started at equidistant circumferential points on the blank. In the present instance the locking of the disk 8 and worm wheel 6 is effected by means of a spring bolt 40 (Fig. 3) adapted to either of the series of equidistant openings in the face of the wheel 6, said spring bolt being thrust inward by the action of the spring 41, and retracted by the action of a cam lever 42.

In suitable guides 9 on the foundation of the machine is guided a transverse slide 10 which can be moved to and fro in its guides in the same manner as the slide of a lathe, and this slide carries a table 11 upon which is mounted a swing plate 12 also having guides 13 for a carriage 14 provided with bearings for a shaft 15, and for a second shaft 16 above the same, the forward end of the shaft 15 carrying a milling tool 17, while the shaft 16 is provided with a pulley 18 for receiving a driving belt from any available countershaft, said shafts 15 and 16 being geared together by means of a spur wheel 19 and spur pinion 20. The carriage 14 is controlled by a screw 21 and a nut 22 so that it can be moved to and fro on the swing plate 12, and thereby feed the milling cutter 17 toward and from the work. When, therefore, the cylindrical blank from which the desired worm is to be produced is clamped between the head stock 4 and tail stock 5 the swing plate 12 is so adjusted on the bed plate 1 that the axis of said swing plate is at precisely the same distance from the axis of the worm blank as will be the axis of the worm wheel with which said worm is intended to engage, and as the swing plate 12 is caused to swing horizontally upon its axis while the milling cutter 17 is forming the groove in the worm blank, it follows that the face of the worm which is being cut will be of exactly the same contour as the periphery of the wheel with which said worm is to engage, hence the thread or threads of the worm will be in mesh with the teeth of the worm wheel from end to end of the worm, and not only at a central point on the worm as when the latter is cylindrical instead of concave.

The pitch of the thread or threads produced upon the worm will depend upon the relation between the speed of rotation of the shaft 3 and the speed at which the table 12 swings, and I provide for connecting said shaft and table so that the speed of one may be properly regulated in respect to the speed of the other to produce a worm with thread or threads of any desired degree of pitch.

As shown in the drawings, the gearing for accomplishing this result is as follows: Upon the periphery of the swing plate 12 are formed worm teeth which may extend entirely around said plate or throughout any desired segment of its circumference, and with these teeth engages a worm 25 splined upon a shaft 26, and confined longitudinally between bearings 27 on a bracket projecting from the table 11, so that as the said table is moved to and fro the worm 25 will be likewise moved on the shaft 26 and will therefore always remain properly in mesh with the teeth of the swing plate. The outer end of the shaft 26 is provided with a worm wheel 28 which meshes with a worm 29 on a short transverse shaft mounted in bearings on the bed plate 1, said shaft having a bevel wheel 30 which meshes with a bevel pinion 31 on a shaft 32 likewise adapted to a bearing on the bed plate, and provided with a spur wheel 33 which meshes with a like wheel 34, the latter meshing with a spur wheel 35 on the shaft 7 which drives the worm 6 of the shaft 3. It will therefore be seen that the shaft 3 and swing plate 12 will be simultaneously operated, the speed of said plate 12 in respect to that of the shaft being dependent upon the relative sizes of the spur wheels 33 and 35, and provision is afforded for variation in the size of these two wheels, by mounting the intermediate wheel 34 upon a slotted arm 36 adjustable on a bracket 37 on the bed plate so that whatever may be the size of the wheel 35 the wheel 34 can be adjusted so as to properly mesh with the same, and with the wheel 33. It should be understood, however, that various forms of change gear may be interposed between the shaft 3 and the swinging table, without departing from the essential feature of my invention, and that a swinging arm or other carrier operated in any desirable way may be substituted for the swinging plate. The swinging plate is always to be preferred, however, and when it is used it is preferably steadied in its movement by providing it with one or more downwardly projecting annular ribs 45 and 46, two of such ribs being shown in Fig. 4, the peripheries of these ribs fitting snugly against the walls of annular recesses in the table 11. The vertical confinement of the swing plate to the table is effected by means of a washer 47 and screw 48 let into an annular recess in the top of the swing plate, as also shown in Fig. 4.

Having thus described my invention, I claim and desire to secure by Letters Patent:

1. A worm gear cutting machine having a rotating shaft carrying the worm blank, a swinging plate, the axis of which is adjustable laterally from and toward that of the shaft, a rotating cutter, occupying a position between the worm blank shaft and the axis of the swinging carrier and a carriage for the said cutter being adjustable on said swinging plate from and toward the axis of the shaft, substantially as specified.

2. A worm gear cutting machine having a rotating shaft for the worm blank, a swinging carrier for the cutting tool, said carrier having an axis adjustable laterally from and toward the shaft, and gearing whereby the rotating shaft and swinging tool carrier are connected, that element of said gearing which engages with the swinging carrier being movable laterally with said carrier, substantially as specified.

3. A worm gear cutting machine having a swinging carrier for the cutting tool, a rotating shaft for the worm blank, a driving wheel loose on said shaft, a clutch adapted to connect the shaft to the driving wheel after each of a series of equidistant circumferential movements, and gearing connecting the worm blank shaft and swinging tool carrier and providing for movement of the latter simultaneously and in consonance with the said shaft substantially as specified.

4. A worm gear cutting machine having a rotating shaft carrying the worm blank, a swinging carrier for the cutting tool, a primary power shaft, a set of worm gears interposed between said primary power shaft and the rotating shaft of the machine, a shaft having a worm meshing with worm teeth on the swinging tool carrier and a worm wheel meshing with a worm on a second shaft at right angles thereto and subordinate gearing interposed between the primary power shaft and said right angled shaft, substantially as specified.

5. A worm gear cutting machine having a rotating shaft for the worm blank, a rotary cutting tool having its axis at right angles to but in the same plane as the axis of the said shaft, a swinging carrier for said cutting tool having its axis adjustable from and toward the shaft, and a slide having bearings for the cutter shaft and mounted upon the swinging carrier so as to be adjustable from and toward the axis of the worm blank shaft, substantially as specified.

6. A worm gear cutting machine having a rotating shaft carrying the worm blank, the swinging carrier for the cutting tool, and gearing interposed between the said shaft and the swinging carrier for effecting the joint and simultaneous operation of said shaft and cutter carrier, elements of said gearing being change wheels, whereby the speed of movement of the cutter carrier in respect to that of the rotating shaft may be varied, substantially as specified.

7. The combination of the table having a central upwardly projecting post, and inner and outer annular bearing walls beyond the same, with the swinging tool carrier confined vertically to said post and having inner and outer depending ribs in contact respectively with the inner and outer annular bearing walls of the table, substantially as specified.

In testimony whereof I have signed my name to this specification in the presence of two subscribing witnesses.

GEO. S. ROMINGER.

Witnesses:
WILLIAM D. CONNER,
HARRY SMITH.